United States Patent [19]
Petechik

[11] Patent Number: 5,363,792
[45] Date of Patent: Nov. 15, 1994

[54] SAFETY SIGNAL KIT

[76] Inventor: Charles R. Petechik, 4252 West 214th St., Fairview Park, Ohio 44126

[21] Appl. No.: 116,407

[22] Filed: Sep. 2, 1993

[51] Int. Cl.$^5$ .............................................. B60Q 7/00
[52] U.S. Cl. .................................. 116/28 R; 359/525
[58] Field of Search ............... 40/440, 479; 116/28 R, 116/63 P, 173, 209; 359/525; 446/217, 218

[56] References Cited

U.S. PATENT DOCUMENTS

| | | | |
|---|---|---|---|
| 1,798,052 | 3/1931 | Additon | 359/525 |
| 2,701,540 | 2/1955 | Hamilton | 116/35 R |
| 2,781,017 | 2/1957 | Fuller et al. | 116/63 |
| 2,797,621 | 7/1957 | Gladen | 359/525 X |
| 3,292,569 | 12/1966 | Trigilio | 116/63 |
| 4,017,991 | 4/1977 | Berger | 40/440 |
| 4,041,452 | 8/1977 | Moya | 340/134 |
| 4,103,924 | 8/1978 | Suhm | 280/289 R |
| 4,120,561 | 10/1978 | Burkholder | 359/525 |
| 4,519,153 | 5/1985 | Moon et al. | 40/591 |
| 4,590,883 | 5/1986 | Steed et al. | 116/173 |
| 5,014,641 | 5/1991 | Johnson | 116/28 R |
| 5,267,525 | 12/1993 | Person et al. | 116/28 R |

OTHER PUBLICATIONS

SafeTSpin flier entitled "Unique Highway Warning Signal".
"Quick Safety Signals" flier on QSS Warning Triangle.

Primary Examiner—Diego F. F. Gutierrez
Assistant Examiner—Willie Morris Worth
Attorney, Agent, or Firm—Fay, Sharpe, Beall, Fagan, Minnich & McKee

[57] ABSTRACT

A safety signal kit includes a hub and a plurality of vanes selectively mounted on the hub. The hub is selectively mounted on a first end of a shaft. A second end of the shaft is selectively secured to a base. The base can be an elongated body having a socket located adjacent a first end thereof and a recess located adjacent a second end thereof. The socket is adapted to hold the shaft second end. The recess is adapted to accommodate a portion of a window of a vehicle. Alternatively, the base can include a support member having a socket for accommodating the shaft second end and a housing into which the support member can be slid. Fasteners would then be used to secure the housing to an associated structure such as a roadside barricade or the like.

21 Claims, 5 Drawing Sheets

SAFETY SIGNAL KIT

BACKGROUND OF THE INVENTION

This invention pertains to signal devices. More particularly, the present invention relates to motor vehicle signal devices.

The invention is particularly applicable to roadside or highway warning devices which indicate that caution should be exercised when approaching a particular location on a road. However, it will be appreciated by those skilled in the art that the invention can readily be adapted for use in other safety or warning environments where the attention of a bypasser should be directed to a particular location.

Warning devices for drivers of motor vehicles approaching a particular location in a road are known. For example, highways under construction usually employ orange barrels or roadside barricades which oftentimes have battery powered flashers mounted thereon. Such battery powered flashers are also utilized by some drivers when their motor vehicle has broken down on the side of a road. Other drivers have employed roadside flares for this purpose. A third type of known device is a safety warning triangle which is mounted on the disabled vehicle or is used adjacent thereto. Each of these devices, however, has its own limitations.

Battery powered flashers are only useful as long as their battery lasts. Oftentimes such flashers are stored in a vehicle, and when the need for them arises the driver, to his consternation, finds that the battery in the flasher has discharged, so that the flasher no longer works. Flares are disadvantageous because they burn out rather quickly and they can cause serious burns either during lighting or during the time they are burning. Free-standing safety triangles are disadvantageous from the standpoint that often the wind will blow them over. In addition, all three of these types of devices are disadvantageous from the standpoint that the driver has to leave the safety of his vehicle in order to employ any of them. For a stranded motorist, getting out of his car is quite hazardous as the motorist can be struck and killed by a passing motorist who did not even see him. The addition of bad weather only multiplies the problems of visibility and slows down the reaction time of motorists passing by the stranded vehicle. A snowstorm can present even greater dangers to the occupants of stranded cars if they decide to leave their car to seek help.

Safety warning triangles which are car mounted, and other car mounted warning signs, are advantageous from the standpoint that their deployment does not involve the driver getting out of his vehicle to deploy the warning sign. However, they are disadvantageous from the standpoint that such known warning devices are hoe prominently visible so as to be noticed by approaching drivers far enough away from the stranded vehicle so as to allow approaching drivers enough time to steer around the stranded vehicle.

The present invention contemplates a new and improved apparatus which overcomes all of the above referenced problems and others and provides a new and improved safety signal device which is simple in design, economical to manufacture, light in weight, highly visible, can be assembled in the motorist's vehicle, and can be deployed without the motorist having to leave the safety of his vehicle.

BRIEF SUMMARY OF THE INVENTION

In accordance with one aspect of the invention, a safety signal kit is provided.

More particularly in accordance with this aspect of the invention, the kit comprises a hub and a plurality of vanes selectively mounted on the hub. A shaft is provided having a first end on which the hub is selectively mounted and a second end. The shaft second end is selectively secured to a base.

In one embodiment, the base comprises an elongated body having a first end and a second end. A socket is located adjacent to the body first end with the shaft second end being secured in the socket. A recess is located adjacent the body second end with the recess being adapted to accommodate a portion of a window of a vehicle. Preferably, the hub comprises a plurality of spaced elongated sockets and the vanes each have an enlarged first edge which fits in a respective one of the hub sockets. The shaft first end can comprise a pair of resilient fingers and a flange spaced from the fingers, the hub being mounted on the shaft between the pair of fingers, and the flange. If desired, a warning indicium can be located on at least one of the vanes. The warning indicium can be a reflective tape.

The safety signal can further include a securing means for selectively holding the hub to the shaft. The securing means can be a pair of resilient fingers located on the shaft first end and a flange spaced from the shaft first end. The base can comprise, alternatively, a support member having a socket for accommodating the shaft second end and a housing into which the support member can be slid. A fastener would then be used to secure the housing to an associated roadside barricade or the like.

In accordance with another aspect of the present invention, a safety signal is provided, which can be selectively assembled.

More particularly in accordance with this aspect of the invention, the safety signal comprises a hub and a plurality of vanes selectively mounted on the hub. A shaft is provided having a first end and a second end. A securing means is located at the shaft first end for selectively holding the hub to the shaft. A bracket is provided to which the shaft second end is selectively secured.

The bracket can comprise an elongated body having a first end and a second end, a socket located adjacent to body first end and a recess located adjacent to body second end. Alternatively, the bracket can comprise a support member having a socket for accommodating the shaft second end and a housing into which the support member can be slid. A fastener is provided for securing the housing to an associated structure. If desired, a warning indicium can be located on at least one of the vanes. The securing means can comprise a pair of resilient fingers located on the shaft first end and a flange spaced from the shaft first end, the hub being mounted on the shaft between the pair of fingers on the flange. Preferably, the hub comprises a plurality of spaced elongated sockets and the vanes, each have a enlarged first end which fits in a respective one of the hub sockets.

One advantage of the present invention is the provision of a new and improved safety signal kit which is simple in design and economical to manufacture.

Another advantage of the present invention is the provision of a safety signal device that can be selectively assembled when needed and can, at all other times, be merely stored in kit form in, e.g., the glove compartment, of the vehicle with which it will be used.

Still another advantage of the present invention is the provision of a safety signal device which does not need an external source of power, such as batteries, to operate.

Yet another advantage of the present invention is the provision of a safety signal device which is clearly visible at sizeable distances from the stranded vehicle with which it is employed. To this end the device can extend above the roof of such vehicle.

A further advantage of the present invention is the provision of a safety signal device which includes a warning indicium so as to enhance visibility. In addition, the device is preferably manufactured in bright colors so as to be clearly visible at large distances.

A still further advantage of the present invention is the provision of a safety signal device which includes a plurality of vanes mounted on a hub so that the device can be rotated by the wind without requiring any external means of motive power.

Still other benefits and advantages of the subject new safety signal device will become apparent to those skilled in the art upon a reading and understanding of this specification.

BRIEF DESCRIPTION OF THE DRAWINGS

The invention may take physical form in certain parts and arrangement of parts, preferred embodiments of which will be described in this specification and illustrated in the accompanying drawings which form a part hereof and wherein.

DETAILED DESCRIPTION OF THE PREFERRED EMBODIMENTS

Figures 1A, 1B:
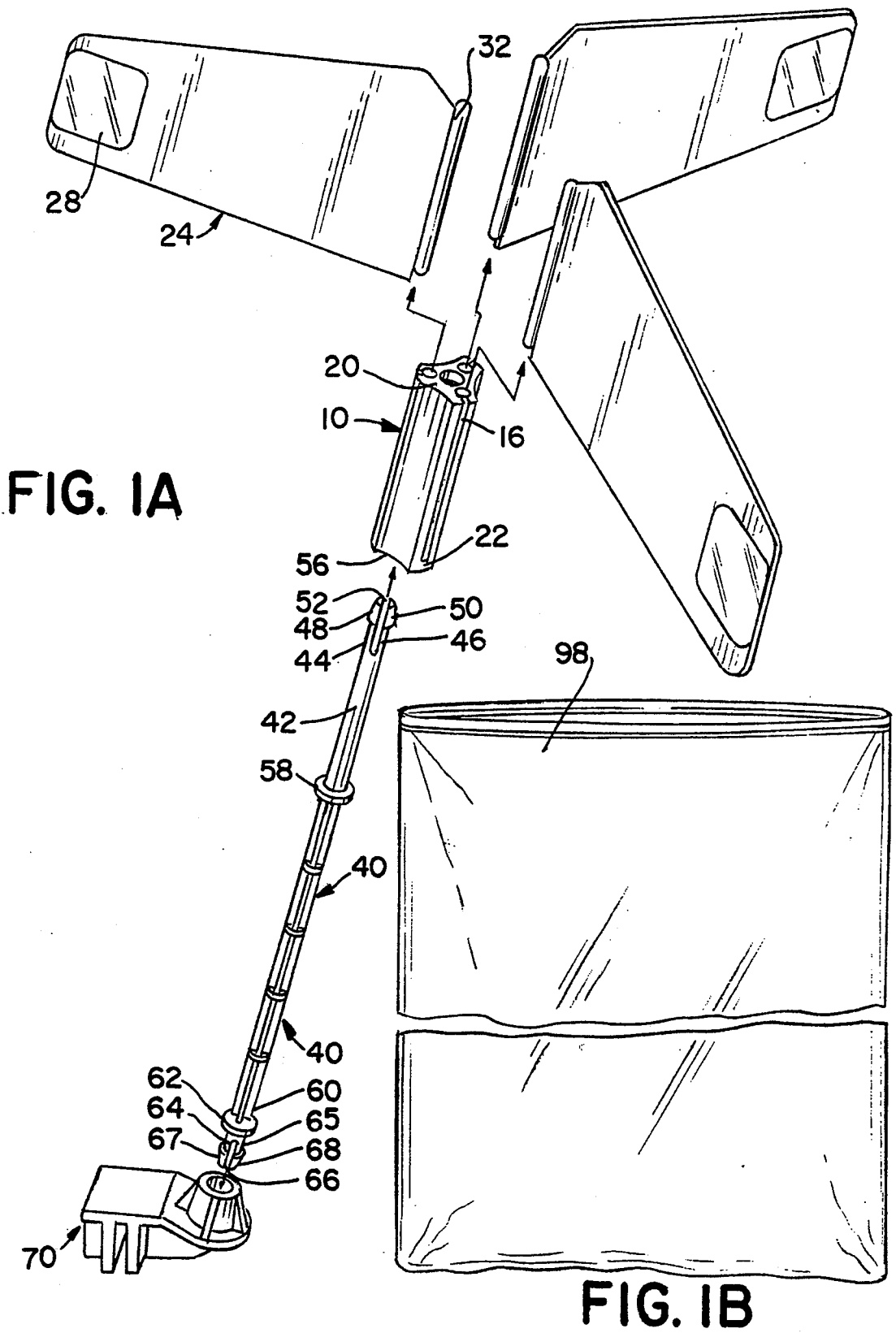
FIG. 1A is an exploded perspective view of a safety signal device according to the present invention.
FIG. 1B is a front elevational view, partially broken away, of a storage bag for holding the safety signal device of FIG. 1A when it is disassembled for storage purposes.
Figure 4:
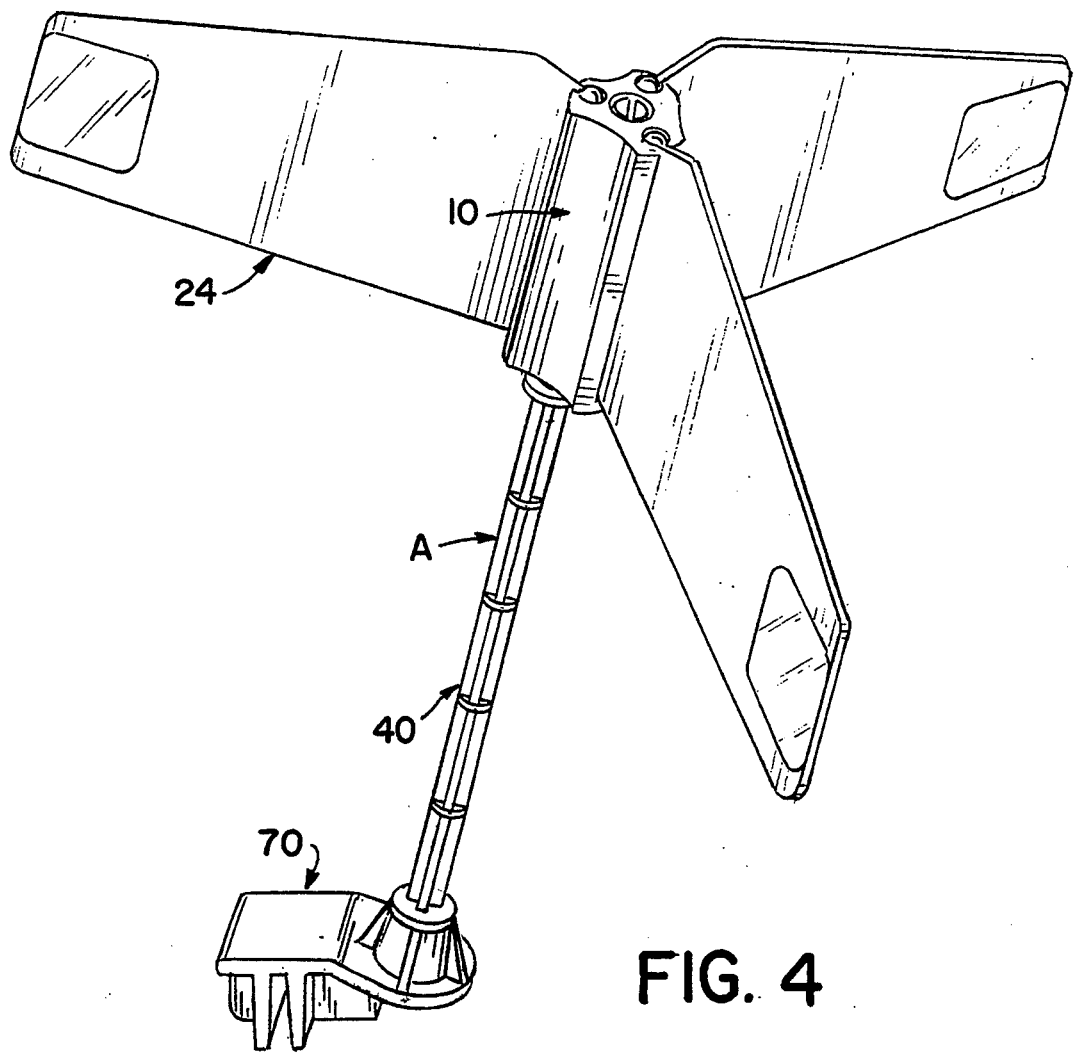
FIG. 4 is an assembled perspective view of the device of FIG. 1A.

Referring now to the drawings wherein the showings are for purposes of illustrating the preferred embodiments of the invention only and not for purposes of limiting same, FIG. 4 shows a safety signal device A according to the present invention. The device is produced in kit form as shown in FIG. 1A so that it can be readily assembled when needed. While the safety signal device is particularly adapted for, and will hereinafter be described in connection with, motor vehicles, such as cars or trucks, that become stalled on or adjacent roadways, it is evident that the device can also be utilized with roadside barricades or with other environments in which a safety signal is necessary. Such environments could include stranded snowmobiles, downed airplanes, boats adrift at sea, and the like. The device can further be used by lost hikers or in connection with obstacles about which bypassers should be warned.

Figure 2:
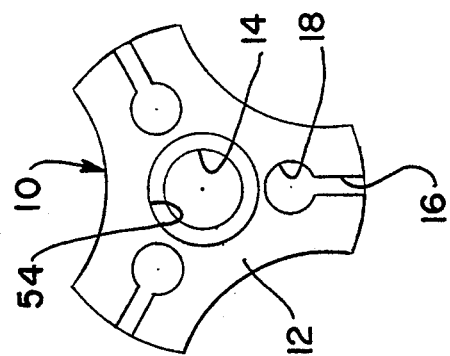
FIG. 2 is an enlarged top plan view of a hub of the device of FIG. 1A.

The device A includes a hub 10. With reference now also to FIG. 2, the hub 10 can comprise a truncated somewhat "Y" shaped body 12 in top view having a central aperture 14. Each of the three legs of the body 12 includes a slot 16 extending from a free end of the leg to a socket 18. With reference now to FIG. 1A, it can be seen that each of the slots 16 extends from a top end 20 of the hub substantially the length of the hub 10, but terminates in a closed section 22 adjacent the lower end of the hub. Adapted to slide into the sockets of the hub 10 are a plurality of vanes 24.

Figure 3:
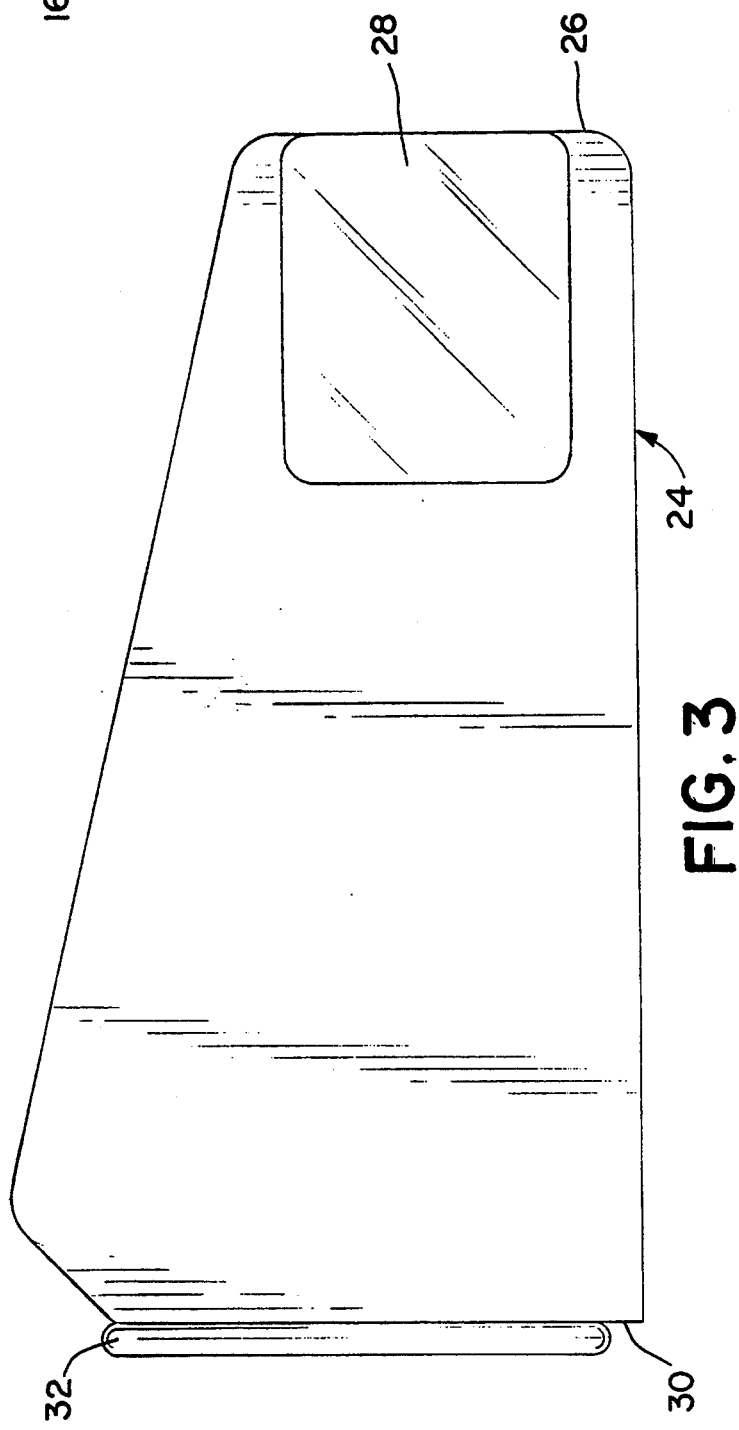
FIG. 3 is an enlarged side elevational view of a vane of the device of FIG. 1A.

With reference now also to FIG. 3, each of the vanes 24 comprises a first side 26 adjacent to which is preferably provided a warning indicium 28 and a second side 30 having an enlarged edge 32. The warning indicium 28 can be a piece of reflective tape adhered to the vane. Preferably such reflective tape is provided on both sides of each of the vanes illustrated. The enlarged edge 32 along the second side of the vane 24 is so sized as to fit in the sockets 18 of the hub 10.

With reference again to FIG. 1A, the hub is selectively mounted on a shaft 40. The shaft has a first end 42 which comprises first and second resilient fingers 44,46. Each of these fingers is provided with a respective enlarged head section 48,50. The fingers are separated by a slot 52.

In use, the hub 10 is slid over the shaft 40 such that the first and second fingers 44,46 of the shaft extend through the hub central aperture 14. The enlarged heads 48, 50 of the fingers then snap over a shoulder 54 (best seen in FIG. 2) recessed into the hub top edge 20 to fasten the hub to the shaft. A bottom edge 56 of the hub is then positioned adjacent a first flange 58 on the shaft in order to prevent the hub from sliding down the shaft 40.

Figure 5:
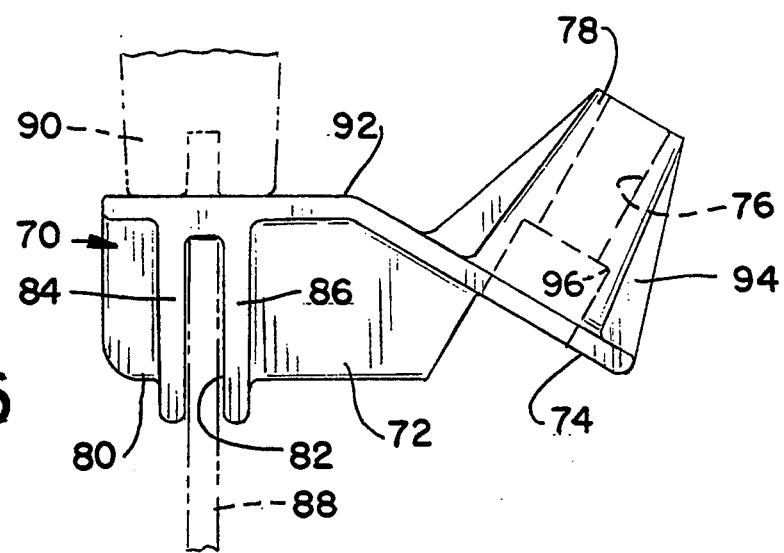
FIG. 5 is an enlarged side elevational view of a base of FIG. 1A as employed on a vehicle door.

The shaft is further provided with a second end 60 adjacent which is located a second flange 62. The shaft terminates at its second end in a pair of resilient fingers 64, 65 separated by a slot 66. Each of the fingers includes an enlarged head 67, 68. One suitable means for seating the shaft 40 is a base 70. With reference now to FIG. 5, the base 70 can comprise an elongated body 72 having a first end 74 adjacent which is located a bore 76 defined in a housing 78. The body 72 is also provided with a second end 80 adjacent which is defined a recess 82 by a pair of spaced shoulders 84, 86. It is evident from FIG. 5 that the bore 76 is angled in relation to the recess 82 such that the axis of the bore and the axis of the recess intersect each other.

The base 70 is adapted to cooperate with a conventional motor vehicle illustrated in dashed lines in FIG. 5. To this end, a window 88 of the motor vehicle can extend into the recess 82 since the shoulders 84, 86 are suitably spaced from each other in order to accommodate the window 88. A vehicle door frame 90 extends above the base 70. With reference now to FIG. 4, the base includes a planar surface 92 leading from the recess 82 to the bore 76. Provided on such planar surface 92 are a plurality of reinforcing ribs 94 around the housing 78. The vehicle frame 90 contacts the planar surface 92 to hold the base in position on the vehicle.

In order to secure the shaft 40 to the base 70, the resilient pair of fingers 64, 65 at the shaft second end 60 are urged through the bore 76 until the enlarged heads 67, 68 of the fingers snap over a shoulder 96 recessed into the housing 78. The flange 60 prevents the shaft 40 from sliding further into the base 70. In this way, the shaft 40 is selectively secured in the base 70.

The device A is particularly advantageous in that it can be easily assembled when needed and can be simply stored in a reusable bag, such as a conventional selectively lockable plastic bag 98 illustrated in FIG. 1B, when not in use. Such bag with the component parts can fit neatly under the front seat of a car or in a glove compartment or the like.

In order to disassemble the safety warning device A, one needs merely to slide the vanes 24 upwardly and out of the hub 10 disengaging the enlarged second ends 32 from the sockets 18. Then, one can grasp the two shaft upper fingers 44 and 46 pushing them towards each other. Once this is done, the hub 10 can be slid off the shaft 40. Thereafter, one can grasp the two lower fingers 64 and 65 pushing them towards each other by accessing the open bottom of the bore 76. When this is done, one can slide the base 70 downwardly and away from the shaft 40. Thereafter, all of the components can be stored in the bag 98 until needed again.

The device is also advantageous in that it will extend approximately one foot above the roof of the vehicle to which it is attached for high visibility, and will provide a fairly sizeable fluorescent reflective surface that will rotate with the slightest wind. Moreover, the device of the present invention is advantageous in that it allows the driver of the stranded vehicle to remain safely within his vehicle, rather than having to get out in order to deploy a safety warning device. Moreover, the safety signal device of the present invention does not need any external source of power, and therefore will not burn out as would a flare or a battery powered warning light. Also, the safety signal device, disclosed herein, will not be knocked over by the wind. Instead, as long as the device is adequately secured between a window and a door frame of the vehicle, the wind will simply spin the vanes at a faster rate, thereby making the device more visible yet to passing motorists.

The shaft can be on the order of one (1) foot tall in order that the vanes are elevated from the door of the vehicle by approximately one (1) foot. The hub can be on the order of four (4) inches high and have a diameter of about 1.5 inches. The base 70 can be on the order of 1.5 inches wide and high and 3.5 inches long if desired. Each of the vanes 24 can be approximately nine inches long and five inches high if desired. It should be recognized that the shaft, hub, base and vanes can be made of any suitable height and length or diameter as maybe needed for different embodiments in which the safety warning device is to be used.

The vanes 24, the hub 10, and the shaft 40 can be made from a suitable thermoplastic material, such as polypropylene. Preferably, all of these components are colored a bright fluorescent safety orange so as to be readily visible at large distances. The base 70 can be similarly manufactured from a suitable thermoplastic material such as polypropylene and can also be colored a bright fluorescent orange if desired.

The warning indicium 28 can be a silver tape or the like in order to enhance night visibility. With such a reflective tape, the headlights of an oncoming vehicle will reflect back to the driver of the vehicle and the rotation of the vanes will provide a flashing effect to the drivers of oncoming vehicles in order to warn them to slow down since there is a stranded motorist or other road obstruction ahead.

It should be noted that due to the rotation of the vanes and the position of the reflective tape warning indicia 28, the safety warning device will be visible in a 360° radius around the stranded motor vehicle. In this way, motor vehicles approaching from any direction will be warned.

While the safety warning device is illustrated as being employed with three vanes 24, it should be recognized by those of average skill in the art that the hub could be provided with as many slots as are needed in order to employ, e.g. four or five vanes, should that become necessary.

The base to which the shaft 40 is secured will vary depending upon the type of associated support structure to which the base is adapted to be mounted. Therefore, other types of bases such as, e.g. magnetic bases, can be provided for certain applications such as, for example, securing the safety warning device to roadside guardrails, metal barrels, and the like.

Figure 6:
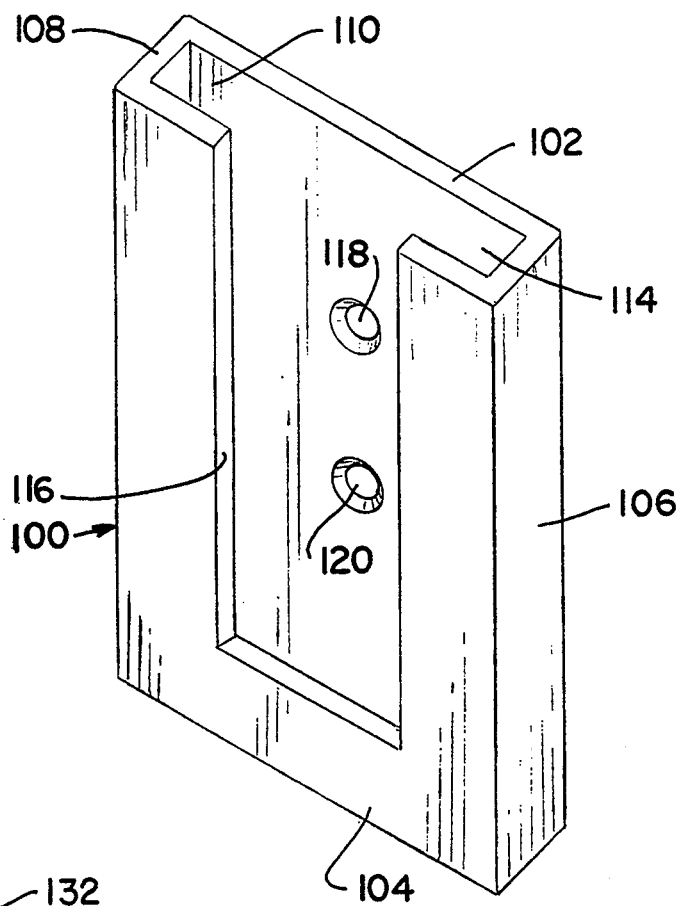
FIG. 6 is a perspective view of a housing according to another embodiment of the present invention.
Figure 7:
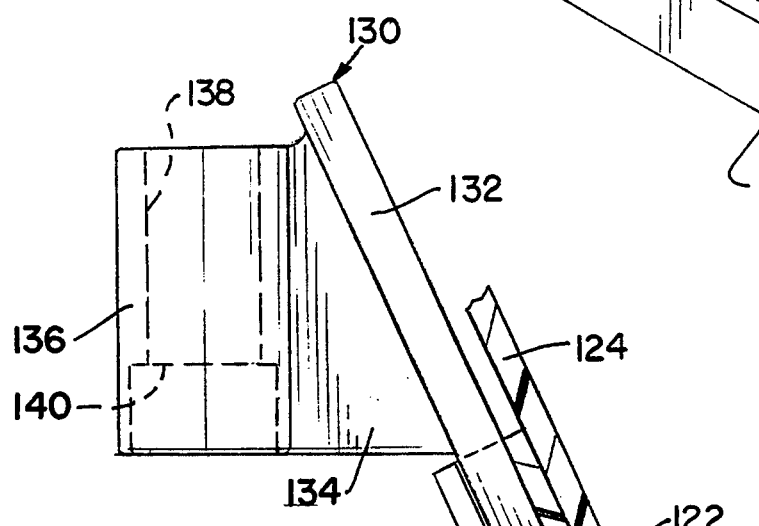
FIG. 7 is a side elevational view partially in cross-section of the housing of FIG. 6 secured to an associated support structure and receiving a support member according to the present invention; and, FIG. 8 is an exploded perspective view, on a reduced scale, of the safety signal device of FIG. 1A being used with the support member of FIG. 7 and in the process of being mounted to a roadside barricade.

In another embodiment of the invention, the base can be suitably designed so as to adapt the device for use in connection with a roadside barricade or the like. To this end, and with reference now to FIG. 6, the base can comprise a housing 100 having a rear wall 102, a front wall 104, a pair of side walls 106, 108, a top opening 110, and a bottom wall 112 (FIG. 7). The housing 100 thus forms a socket 114. A slot 116 is defined in the front wall 104. Provided in the rear wall are a pair of spaced apertures 118, 120. Each of these can be aligned with a respective aperture 122 formed in an associated planar member 124. Selectively extending through each of the aligned apertures 118, 122 is a suitable fastening means. One such fastening means can be a bolt 126 which is secured in place with a nut 128. In this way the housing 100 is fastened to the support structure 124.

Figure 8:
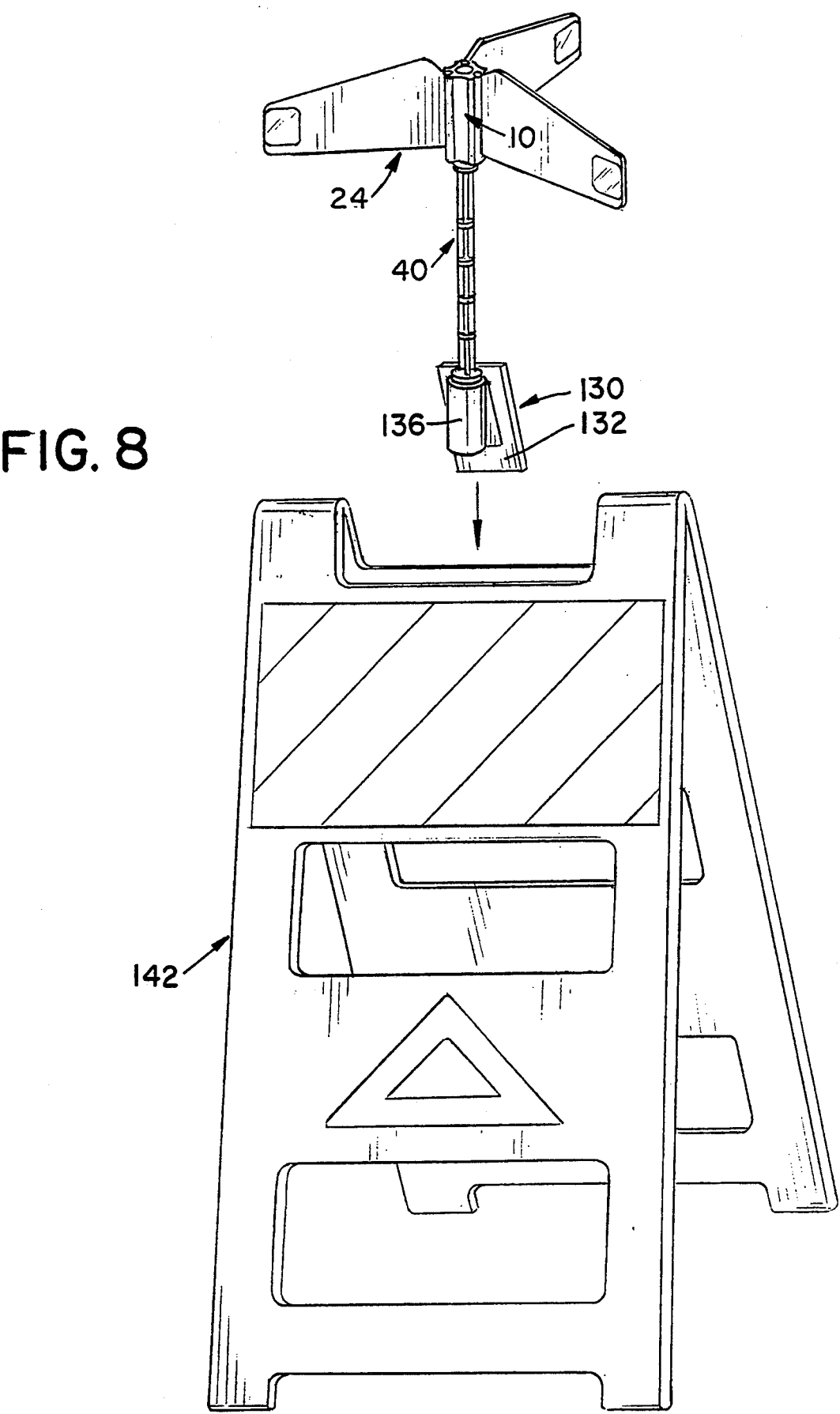

With reference now to FIG. 7, adapted to slide into the socket 114 is a support member 130. This member can include a planar section 132, best seen in FIG. 8, and projecting therefrom an arm 134. The arm 134 carries a housing 136 in which is defined a bore 138. The arms 64, 65 located in the shaft lower end can selectively extend into the bore 138 as shown in FIG. 8. To secure the shaft lower end in position in the support member 130, the enlarged heads 67, 68 of the shaft snap over a shoulder 140 defined in the bore of the housing 136. Thereafter, the safety warning device can be mounted to a suitable conventional street barricade 142. To this end, the planar member 124, illustrated in FIG. 7, can be one of the legs of the barricade 142.

It can thus be seen that the safety warning device can be utilized, not only by motorists whose vehicle may have become disabled on the road, but also by road maintenance crews and the like.

The invention has been described with particular reference to preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. A safety signal kit comprising:

a hub;

a plurality of vanes selectively mounted on said hub, wherein said hub has a central aperture for rotatably receiving a shaft;

the shaft having a first end, on which said hub is selectively and rotatably mounted, and a second end; wherein said shaft first end comprises a pair of resilient fingers and a flange spaced from said fingers, said hub being mounted on said shaft between said pair of fingers and said flange; and, a base to which said shaft second end is selectively secured.

2. The safety signal of claim 1 wherein said base comprises:

an elongated body having a first end and a second end;

a bore located adjacent said body first end, wherein said shaft second end is secured in said bore; and, a recess located adjacent said body second end, wherein said recess is adapted to accommodate a portion of a window of a vehicle.

3. The safety signal of claim 1 further comprising a warning indicium located on at least one of said vanes.

4. The safety signal of claim 3 wherein said warning indicium comprises a reflective tape secured to said at least one vane.

5. The safety signal of claim 1 further comprising a securing means for selectively holding said shaft to said base.

6. The safety signal of claim 5 wherein said securing means comprises:

a pair of resilient fingers located on said shaft second end; and, a flange spaced from said shaft second end.

7. The safety signal of claim 1 wherein said base comprises:

a support member having a bore for accommodating said shaft second end;

a housing into which said support member can be slid; and, a fastener for securing said housing to an associated roadside barricade.

8. A safety signal which can be selectively assembled, comprising:

a hub;

a plurality of vanes selectively mounted on said hub;

a shaft having a first end and a second end;

a securing means located at said shaft first end for selectively holding said hub to said shaft, wherein said securing means comprises:

a pair of resilient fingers located on said shaft first end, and a flange spaced from said shaft first end, said hub having a central aperture for rotatably receiving said shaft, said hub being rotatably mounted on said shaft between said pair of fingers and said flange; and, a bracket to which said shaft second end is selectively secured.

9. The safety signal of claim 8 wherein said bracket comprises:

an elongated body having a first end and a second end;

a bore located adjacent said body first end; and, a recess located adjacent said body second end.

10. The safety signal of claim 8 further comprising a warning indicium located on at least one of said vanes.

11. The safety signal of claim 8 wherein said bracket comprises:

a support member having a bore for accommodating said shaft second end;

a housing into which said support member can be slid; and, a fastener for securing said housing to an associated roadside barricade.

12. The safety signal of claim 8 wherein said hub comprises a plurality of spaced elongated sockets and said vanes each have an enlarged first end which fits in a respective one of said hub sockets.

13. A rotating warning signal kit for vehicles comprising:

a hub having a plurality of sockets and a central aperture for rotatably receiving a shaft;

a plurality of vanes each selectively mounted in a respective socket of said hub;

the shaft having a first end, on which said hub is selectively and rotatably mounted, and a second end; wherein said shaft first end comprises a pair of resilient fingers and a flange spaced from said fingers, said hub being mounted on said shaft between said pair of fingers and said flange; and, a bracket to which said shaft second end is selectively secured, said bracket comprising a mounting means for securing said bracket to an associated support member.

14. The safety signal of claim 13 wherein said associated support member is a vehicle and said bracket comprises:

an elongated body having a first end and a second end;

a bore located at said body first end; and, wherein said mounting means comprises a recess located at said body second end, said recess allowing said bracket to be mounted on a window of the vehicle.

15. The warning signal of claim 14 wherein an axis of said bore intersects an axis of said recess.

16. The warning signal of claim 14 wherein said associated support member comprises a roadside barricade and said bracket comprises:

a support member having a bore for accommodating said shaft second end;

a housing into which said support member can be slid; and, a fastener for securing said housing to an associated roadside barricade.

17. The warning signal of claim 13 wherein said hub sockets are spaced from each other and are elongated and wherein said vanes each have an enlarged first end which fits in a respective one of said hub sockets.

18. A method for installing a safety warning device when needed, the method comprising the steps of:

providing a hub having a central aperture for receiving a shaft and a plurality of sockets, a plurality of vanes, the shaft and a base in kit form until needed; wherein the shaft has a first end comprising a pair of resilient fingers and a flange spaced from said fingers;

sliding each of the plurality of vanes into a respective socket located on the hub;

mounting the hub on said first end of the shaft between said fingers and said flange;

securing a second end of the shaft to the base; and, securing the base to an associated structure.

19. The method of claim 18 wherein said step of securing the base comprises the subsidiary steps of:

positioning an upper edge of a vehicle window in a recess of the base; and, raising the window until a top surface of the base contacts an adjacent door frame portion and thereby securing the base to said associated structure.

20. The method of claim 18 wherein said step of securing the base comprises the subsidiary steps of:

securing a housing to the associated support structure; and, sliding the base into the housing.

21. The safety signal of claim 8 further comprising a housing into which said bracket can be slid; and, a fastener for securing said housing to an associated roadside barricade.

* * * * *